United States Patent [19]

Grolig et al.

[11] Patent Number: 5,238,743
[45] Date of Patent: Aug. 24, 1993

[54] THERMOPLASTIC SHEET PRODUCED BY MULTIPLE STRETCHING STEPS AT DIFFERENT TEMPERATURES

[75] Inventors: Gerhard Grolig, Moerfelden; Werner Roth, Eppstein; Peter Lang, Hochheim; Horst Eberhardt, Walluf, all of Fed. Rep. of Germany

[73] Assignee: Hoechst Aktiengesellschaft, Frankfurt am Main, Fed. Rep. of Germany

[21] Appl. No.: 699,335

[22] Filed: May 13, 1991

[30] Foreign Application Priority Data

May 15, 1990 [DE] Fed. Rep. of Germany ....... 4015571

[51] Int. Cl.$^5$ .......................... B29C 55/12; B32B 5/00
[52] U.S. Cl. .............................. 428/411.1; 264/288.4; 264/290.2; 428/474.4; 428/480; 428/910
[58] Field of Search ................. 428/411.1, 474.4, 480, 428/910, 98; 264/288.4, 290.2

[56] References Cited

U.S. PATENT DOCUMENTS

| | | | |
|---|---|---|---|
| 3,502,766 | 3/1970 | Tsuruta et al. | 264/289 |
| 3,652,759 | 3/1972 | Schlemmer et al. | 264/289 |
| 3,794,547 | 2/1974 | Kuga et al. | 161/1 |
| 4,569,885 | 2/1986 | Yamaguchi et al. | 428/339 |
| 4,985,537 | 1/1991 | Utsumi et al. | 528/272 |

FOREIGN PATENT DOCUMENTS

| | | |
|---|---|---|
| 0077672 | 6/1986 | European Pat. Off. . |
| 0240632 | 10/1987 | European Pat. Off. . |
| 1629562 | 2/1971 | Fed. Rep. of Germany . |
| 3904191 | 8/1990 | Fed. Rep. of Germany . |
| 500062 | 1/1971 | Switzerland . |

OTHER PUBLICATIONS

Patent Abstracts of Japan, vol. 9, No. 114, (M-380) (1837), May 18, 1985, and JP-A-60 02 334 published Jan. 8, 1985.
Database WPIL, Section Ch, Week 19, Derwent Publications, Ltd., and JP-A-57 057 628, published Apr. 6, 1982.

*Primary Examiner*—Paul J. Thibodeau
*Assistant Examiner*—D. S. Nakarani
*Attorney, Agent, or Firm*—Foley & Lardner

[57] ABSTRACT

A plastic sheet, which initially is biaxially stretched above its glass transition temperature and heat-set, is stretched a second time monoaxially or biaxially at temperatures below its glass transition temperature, the stretching ratio in the two directions being in the range from about 0.5 to 10%. The secondary stretching is carried out at temperatures between about 30° C. and 60° C.

This sheet which has been stretched twice is integrated into a laminated safety glass comprising a laminate, in which the plastic sheet carrying a function layer is disposed between two polyvinylbutyral sheets which, in turn, are enclosed between glass panes.

5 Claims, 3 Drawing Sheets

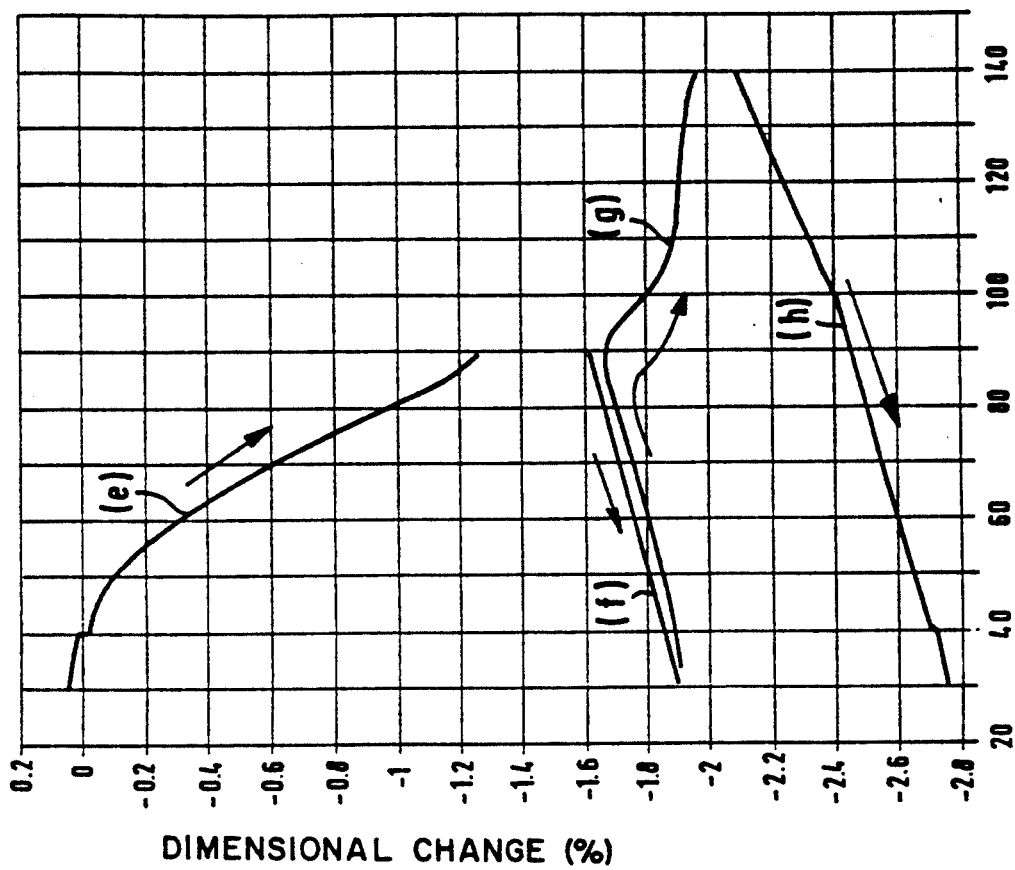
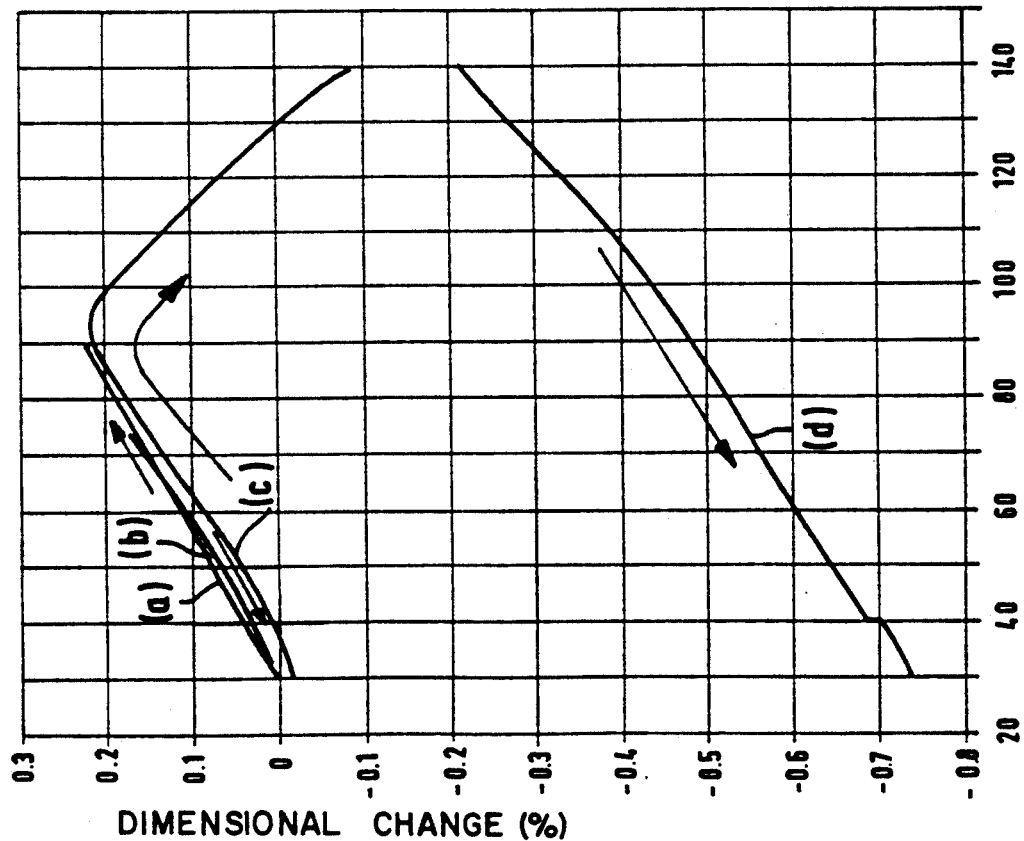

THERMOPLASTIC SHEET PRODUCED BY MULTIPLE STRETCHING STEPS AT DIFFERENT TEMPERATURES

BACKGROUND OF THE INVENTION

The present invention relates to a process for producing a sheet of a thermoplastic which is biaxially stretched at temperatures above the glass transition temperature and heatset, to a sheet produced by the process, and to a laminated safety glass which includes the sheet.

Sheets of thermoplastic materials are frequently joined to other layer materials to form composites. For example, sheets of polyethylene terephthalate are used as supports for function layers. These coated sheets are sandwiched between two sheets of polyvinylbutyral and integrated into laminated safety glass panes.

Laminated safety glass is one of the glazing materials frequently used today. For example, a large proportion of motor vehicle windshields is composed of laminated safety glass. Laminated safety glass is also used in glazing buildings.

In general, conventional laminated safety glass consists of three layers, two glass panes being joined to each other by a sheet of polyvinylbutyral. Such glass laminates offer a high measure of safety since, in the event of an impact loading, the sheet of polyvinylbutyral elastically absorbs mechanical energy, and glass splinters which may be produced remain stuck to the sheet.

The requirements which are imposed presently on laminated safety glass are not, however, limited to the safety aspect.

In many cases it is desirable for laminated safety glasses of this type to fulfill additional functions. It may, for example, be necessary for the pane of laminated safety glass to offer a special heat protection or protection against strong solar radiation. Further requirements, which are imposed, for example, specifically on motor vehicle windshields, are the capability of being electrically heated and the possibility of incorporating so-called head-up displays.

One possibility for equipping laminated safety glass with additional functions is to integrate thin layers into the glass laminate. This can be done by depositing one or more function layers on that side of one of the two glass panes which faces the polyvinylbutyral sheet in the subsequent lamination process. To coat individual glass panes is very complicated and expensive. In producing windshields for motor vehicles, there is the additional difficulty that the coated, initially flat panes also have to pass through a bending process while being heated, and this easily leads to tearing of the function layers. In this critical operational step, the yield of acceptable windshields is low.

It is cheaper to integrate thin function layers into the glass laminates by first depositing the layers in a continuous process on a hightransparency substrate sheet and then incorporating the coated substrate sheet into the glass laminate.

A suitable material for the substrate sheet is polyethylene terephthalate. The coated substrate sheet is embedded between two sheets of polyvinylbutyral and laminated safety glass panes are thus produced which have the structure: glass/PVB sheet/(coated sheet)/PVB sheet/glass. If commercially available polyethylene terephthalate sheets are used, the coated substrate sheet is observed to form corrugations in the finished glass laminates. This has a highly disturbing effect on the appearance of the glass laminates and, what is more, objects viewed through a glass laminate of this kind appear distorted. Use of these glass laminates is out of the question.

European Patent No. 0,077,672 proposes a solution to this problem. The essential idea in this patent is that only those polyethylene terephthalate sheets which have very specific thermomechanical properties are used as the substrate sheet. This means that the thermal shrinkage E of a sheet and its thickness d fulfil the following relationship:

$$4.4 \geq E \geq 0.00028 \times (d-128)^2 \quad (1)$$

$$d < 125 \quad (2)$$

Here E stands for the thermal shrinkage measured in % which sets in after a 30-minute temperature stressing of 120° C., and d for the sheet thickness measured in $\mu$m. The reason for the restriction of the permitted thermal shrinkage to the interval specified in (1) is that, on the one hand, a higher shrinkage results in damage to the function layer and on the other hand, the small flatness faults which always occur in the sheet can no longer be smoothed out with a lower shrinkage.

It was found, however, that it is difficult to produce glass laminates which have a satisfactory appearance even with substrate sheets which fulfil the two relationships (1) and (2). In particular, sheets which fall into the boundary range of the region of the E-d plane defined by the relationships (1) and (2) result in a damaged function layer or in flatness faults in the glass laminates.

The relationship (1) implies that the thinner the sheet is, the more accurately the shrinkage of the sheet has to be adjusted. For sheets having a thickness of $d=12$ $\mu$m, (1) and (2) yield, for example, a shrinkage in the range $4.4 > E > 3.7$. Sheets having a thickness of $d=2.6$ $\mu$m and less are not encompassed by relationship (1). In the patent mentioned, the range $$3.9 \geq E \geq 0.00028 \times (d-130)^2 \quad (3)$$

$$d < 125$$

is described as particularly favorable. Even sheets having a thickness of d less than or equal to 12 $\mu$m are not encompassed by relationship (3).

In most processes for producing composite bodies from sheet-shaped structures, the individual layer materials are first superimposed or united and then subjected to temperature and pressure loading. During heating, films of thermoplastic materials first expand and this causes a corrugation formation in the composite body. To smooth the corrugations again, shrinkage starting at higher temperatures must be very high, but this will then result in damage to the function layer. Dimensional changes which do not damage the function layer are generally insufficient to smooth the corrugations produced by thermal expansion.

German patent application P 39 04 191.3 describes a process for producing a glass laminate comprised of glass, polyvinylbutyral sheet, and coated plastic sheet. Polyethylene terephthalate sheets having specific shrinkage properties and also any commercial hightransparency plastic sheets possessing thermal shrinkage characteristics can be used as the support sheet for the function layer. During the laminating procedure of this process care is taken that the area-related dimension of the sheet carrying the function layer is not reduced. This is achieved by clamping the sheet in a clamping device during the laminating procedure.

This method of producing a laminated safety glass is expensive. Particularly in spherically curved glass panes with complicated edge lines it is difficult to secure the sheet evenly on all four sides during the laminating procedure.

SUMMARY OF THE INVENTION

It is therefore an object of the present invention to provide a process for producing a thermoplastic sheet, which is suitable for integration into a composite body such as, for example, a laminated safety glass and which does not have to be secured along its edges during the laminating procedure in order to prevent a corrugation formation. It is a further object of the present invention to provide a laminated safety glass using this film, which laminated safety glass is substantially free of an undesirable corrugation formation.

In accomplishing the foregoing objects there is provided according to the present invention a process comprising the steps of biaxially stretching a thermoplastic sheet at temperatures above its glass transition temperature, heat-setting the sheet, and stretching the sheet at temperatures below its glass transition temperature. There is also provided a thermoplastic sheet produced by the above-described process, wherein the thermoplastic utilized in the process is selected from the group consisting of polyethylene terephthalate, polyamide and polyether sulfone and wherein the sheet exhibits thermal shrinkage when first heated at a temperature in the range from about 30° C. to 90° C.

In another aspect of the present invention there is provided a laminated safety glass comprising a laminate, in order, of a glass layer, a polyvinylbutyral sheet, a thermoplastic sheet stretched according to the present invention and carrying at least one functional layer, a polyvinylbutyral sheet, and a glass layer. The functional layer can be a light-transparent, heat-reflecting film comprising at least one metal layer and at least one dielectric layer.

Further objects, features and advantages of the present invention will become apparent from the detailed description of preferred embodiments that follows.

BRIEF DESCRIPTION OF THE DRAWING

The present invention is described in more detail below with reference to the drawings, wherein:

FIG. 3 is a graph depicting the dimensional change of a conventional biaxially stretched sheet in the machine direction as a function of temperature, FIG. 4 is a graph depicting the dimensional change of a sheet according to the present invention in the machine direction as a function of temperature.

DETAILED DESCRIPTION OF THE PREFERRED EMBODIMENTS

Figure 1:
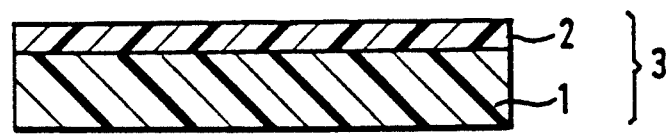
FIG. 1 is a sectional view of a coated sheet according to the present invention.

The sectional view in FIG. 1 shows a coated plastic sheet 3 comprising a substrate sheet 1 and one or more functional layers 2. In FIG. 1, however, only a single functional layer 2 is depicted.

A primary stretching step, to stretch the thermoplastic sheet biaxially, is carried out at temperatures above the glass transition temperature of the sheet. Thereafter the sheet is heat-set and cooled down.

The secondary or further stretching step according to the present invention preferably is carried out at temperatures below the glass transition temperature and in the range from about 30° C. to 60° C. The sheet is either monoaxially or biaxially further stretched. In a preferred embodiment of the process, the sheet is stretched secondarily at temperatures below the glass transition temperature in the longitudinal and transverse directions, the degree of stretching in each direction being between about 0.5% and 10%, preferably between about 5% and 9%.

The sheet produced by the above-described process steps comprises a thermoplastic, such as polyethylene terephthalate, polyamide or polyether sulfone, which is additionally biaxially stretched at temperatures below the glass transition temperature in the range from about 30° C. to 60° C. and, moreover, the sheet exhibits thermal shrinkage at a temperature in the range from about 30° to 90° C.

The process of the present invention offers the essential advantage that the sheet of a thermoplastic material produced according to the process develops no, or only very slight, corrugations that do not impair the functionality of a composite body or of a laminated safety glass when—as an integral part of the composite body—the sheet is subjected to temperature stressing. This is due to the fact that by additionally stretching the sheet below the glass transition temperature thermal expansion of the sheet is compensated by thermal shrinkage starting already at low temperatures, such that no or only very slight, negligible corrugations can be produced.

The material of the substrate sheet 1 shown in FIG. 1 is polyethylene terephthalate, polyamide or polyether sulfone. For the substrate sheet, use is made, for example, of a sheet comprised of a polyethylene terephthalate (Hostaphan 4400 ® produced by Hoechst AG) having a thickness of 36 μm which is coated with a light-transparent, heat-reflecting film 2 in a cathode sputtering installation The light-transparent and heat reflecting film 2 is comprised, for example, of two metal layers and two dielectric layers and has the following structure:

Dielectric layer/silver/ metallic indium-tin oxide/-dielectric layer.

Tin oxide or tin oxynitride in the form $SnO_2$ or $SnO_xN_y$ respectively, with $1 \leq X \leq 2$ and $0 \leq y \leq 1$ can be used as the dielectric layer.

Initially, a sheet of Hostaphan 4400 ® or a thermoplastic having functionally equivalent characteristics is biaxially stretched at temperatures above the glass transition temperature and heatset.

According to the present invention, a continuous process then can be employed for additionally stretching the thermoplastic sheet at temperatures below the glass transition temperature. It is also possible to stretch individual pieces of sheet material. Stretching can be monoaxial, however, biaxial stretching below the glass transition temperature is preferred. Biaxial stretching is carried out simultaneously in the longitudinal and transverse directions, but stretching in sequential steps is also possible.

Figure 2:
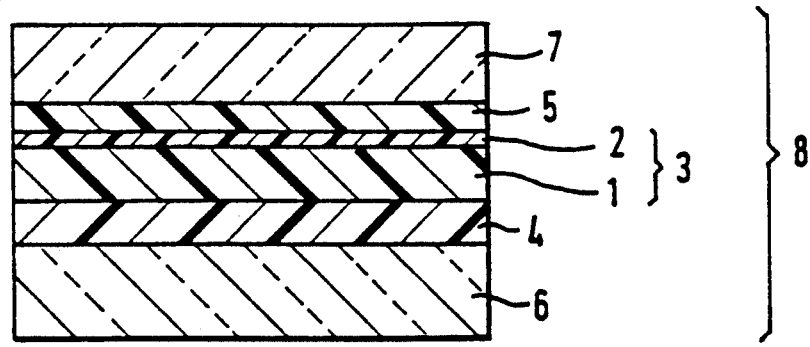
FIG. 2 is a sectional view of the layers of a glass sheet laminate according to the present invention.

The sectional view in FIG. 2 shows a laminated safety glass which comprises a laminate of glass/polyvinylbutyral sheet/plastic sheet carrying a functional layer/polyvinylbutyral sheet/glass. The coated plastic sheet 3, comprising the substrate sheet 1 and one or more functional layers 2 ends with the edge of the other layers of the laminate 8. These layers are the polyvinylbutyral ("PVB") sheets 4 and 5 in contact with both sides of the plastic sheet 3 and the glass panes 6 and 7 adjacent thereto. The process of laminating the plastic sheet 3 with the polyvinylbutyral sheets 4 and 5 in contact therewith and with the adjacent glass panes 6 and 7 is known from the production of conventional laminated safety glass and is therefore not further explained.

The thermal behavior of conventional sheets and of sheets according to the present invention, based on the temperature curve as present in the production of laminate 8 is explained in more detail below by means of one comparative example and two examples of the present invention.

COMPARATIVE EXAMPLE

Hostaphan 4400 ® is a sheet of polyethylene terephthalate, during the production of which stretching is carried out at about 90° C. in the machine direction and at about 110° C. in the transverse direction. The stretching ratio used is 3 in both directions. The sheet is then heat-set at about 230° C. The sheet of the comparative example was not subjected to a secondary stretching after it was heat-set.

Figure 5:
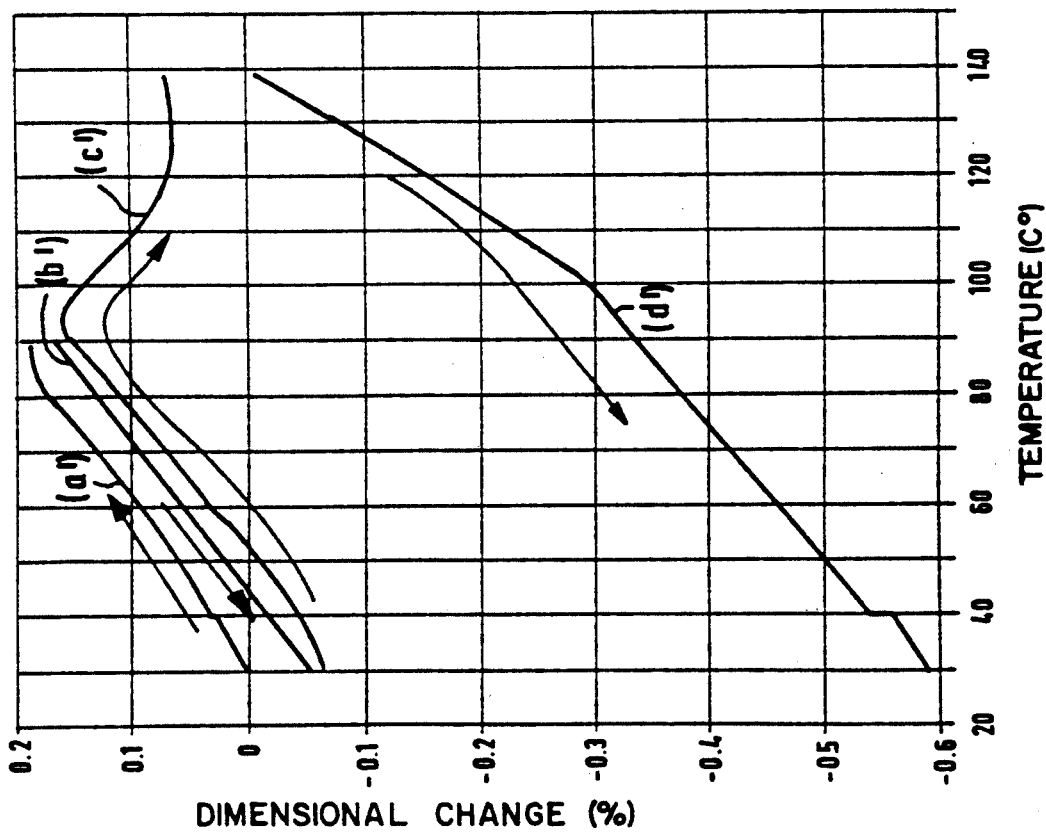
FIG. 5 is a graph depicting the dimensional change of a conventional sheet transverse to the machine direction as a function of temperature.

FIGS. 3 and 5 show the dimensional changes in per cent occurring in a Hostaphan 4400 ® sheet of this kind in the machine direction and transverse to the machine direction as a function of temperature. Negative dimensional changes indicate shrinkage. The sheet passes through a temperature program corresponding to the program used in the production of laminated safety glass.

Curves a, a' in FIGS. 3 and 5 show the dimensional changes during heating of the sheet. This heating corresponds to the laminating process for producing the glass pre-laminate in a rolling installation. In the rolling installation, the laminate is heated to about 90° C. while a compaction pressure is exerted. During heating, the plastic sheet expands and this causes a corrugation formation. After passing through the rolling installation the sheet cools down. The dimensional changes during cooling of the free sheet proceed according to curves b, b'. At 30° C. curves b, b' return approximately to the starting points of curves a, a'. In the sheet embedded in the laminate, however, this is not so since, due to contact with the PVB sheets, thermal expansion cannot be completely reversed upon cooling. In a next step the glass pre-laminate is placed in an autoclave, in which the final laminate product or the laminated safety glass pane is produced under pressure and heating up to 140° C. As can be seen from curves c, c', expansion during this second heating step has a maximum at about 93° C. and upon further heating up to 140° C. the sheet shrinks. The dimensional change of the sheet in per cent during subsequent cooling of the laminate to an initial temperature of 30° C. is shown by curves d and d'.

EXAMPLE 1

In place of the conventional Hostaphan 4400 ® sheet specified in the comparative example, a Hostaphan 4400 ® sheet treated according to the present invention and having a thickness of 36 μm was integrated into the laminate 8. Specifically, the sheet according to the present invention was subjected to a secondary step of biaxial stretching at 60° C. (about 5% in both directions). It was then integrated into the laminate 8 to produce a laminated safety glass having the following structure: glass/polyvinylbutyral/treated Hostaphan 4400 ® sheet/polyvinylbutyral/glass. This sheet exhibits a very good flatness in the laminate and produces no, or slight, negligible corrugations.

The different appearance of the laminated safety glass panes is due to the different thermomechanical behavior of the two sheets.

Figure 6:
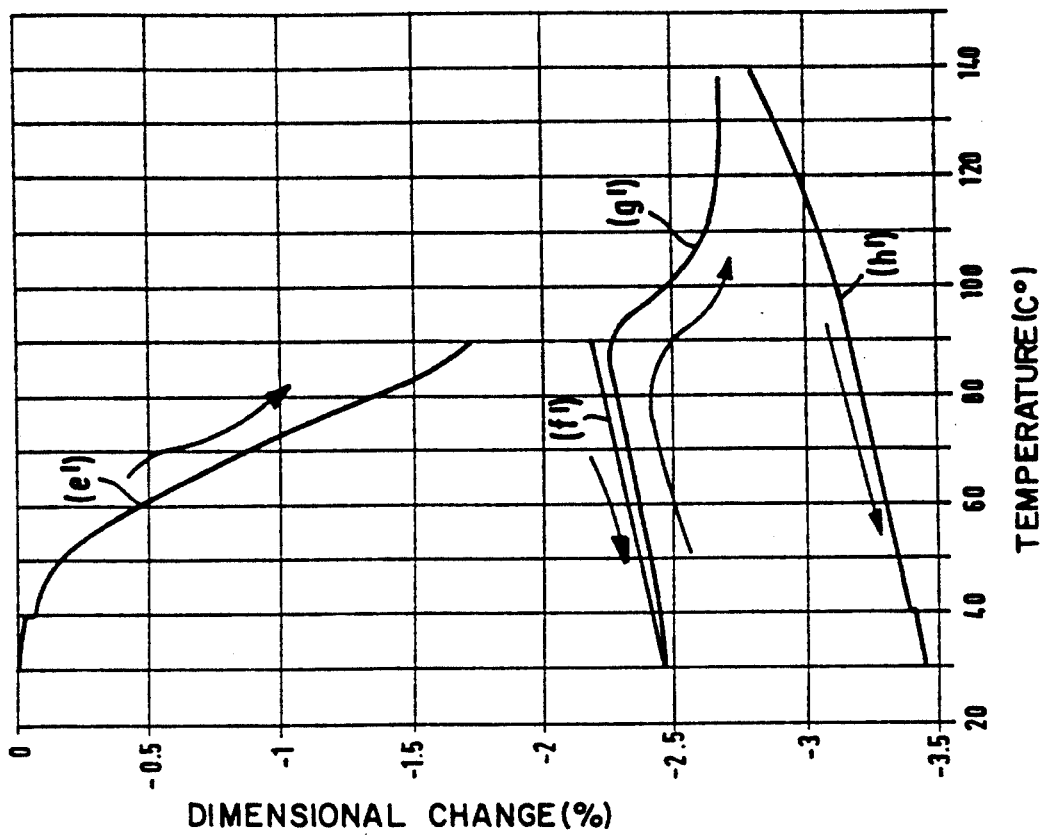
FIG. 6 is a graph depicting the dimensional change of a sheet according to the present invention transverse to the machine direction as a function of temperature.

FIGS. 4 and 6 show the dimensional changes in per cent of a Hostaphan 4400 ® sheet treated according to the present invention, in the machine direction and transverse to the machine direction, respectively, as a function of temperature. Negative dimensional changes indicate shrinkage of the sheet. The temperature program corresponds to the program used in the comparative example. Curves e, e' show that in the additionally or secondarily stretched Hostaphan 4400 ® sheet a thermal shrinkage, which is greater than the thermal expansion produced during the second heating steps as shown by curves g and g', starts at low temperatures ranging from about 30° C. to 40° C. This means that thermal expansion of the second heating step is compensated by thermal shrinkage during the first heating step. During the first heating step, the sheet exhibits thermal shrinkage in the temperature range from about 30° to 90° C., with dimensional change caused by thermal shrinkage in the longitudinal direction being from about 0 to −1.3%. The dimensional change resulting from thermal expansion of the sheet in the longitudinal direction in the temperature range from 30° C. to 90° C. during the heating step after the initial heating and cooling of the sheet is about 0 to +0.2%. These graphs show that thermal shrinkage during the first heating step is considerably higher than thermal expansion during the second heating step in the temperature range from 30° C. to 90° C. A corrugation formation, therefore, does not occur during heating of the sheet.

Curves f and f' show cooling from 90° C. down to 30° C. before the laminate 8 is subjected to the second heating step in an autoclave. In the autoclave the laminate 8, and thus also the sheet 1 included therein, is again heated according to curves g and g'. As can be seen from these curves, a maximum thermal expansion is obtained at about 90° C., which gives rise to a dimensional change of about 0.2%.

Upon further heating from 90° C. to 140° C. the sheet 1 in the laminate 8 shrinks to a dimension which is only slightly below the value of the initial dimension at 30° C. Subsequent cooling of the laminate 8 from 140° C. down to 30° C. takes place according to curves h and h'.

When comparing FIGS. 3 and 5 and 4 and 6, respectively, it is seen that the basic temperature curves in, and transverse to, the machine direction of the sheets are very similar.

EXAMPLE 2

A Hostaphan 4400 ® sheet having a thickness of 36 μm was again biaxially stretched at 30° C. (9% in both directions) according to the present invention. This sheet was integrated into a laminate 8 used for producing a laminated safety glass pane, the laminate having the same structure as in Example 1. Dimensional changes of the plastic sheet as a function of temperature, exhibited essentially a course as shown by the curves in FIGS. 4 and 6 and it is therefore not necessary to describe and illustrate these curves once more. In the laminate 8 this plastic sheet 1 did not show any corrugation formation.

The plastic sheet 1 of Examples 1 and 2 were each coated with a functional layer 2 as described above and integrated into a glass laminate. Even plastic sheets thus coated did not show corrugation formation or tearing of the functional layer 2 as a result of thermal shrinkage in the temperature range from 30° C. to 90° C. and from 30° to 140° C. respectively.

What is claimed is:

1. A thermoplastic sheet produced by a process comprising the following sequential steps:
   first biaxially stretching a thermoplastic sheet at temperatures of 60° C. higher than its glass transition temperature;
   heat-setting the sheet and
   subsequently stretching the sheet at temperatures below its glass transition temperature within the range from about 30° C. to 60° C., wherein the thermoplastic used in the sheet is selected from the group consisting of polyethylene terephthalate, polyamide and polyether sulfone and wherein the sheet exhibits thermal shrinkage when first heated at a temperature in the range from about 30° C. to 90° C. after the subsequent stretching.

2. A sheet according to claim 1, wherein the amount of thermal shrinkage of the sheet when first heated in the temperature range from about 30° C. to 90° C. after the subsequent stretching is greater than the amount of thermal expansion of the heat-set sheet when the sheet, after cooling to 30° C. again, is subjected to a second heating in the temperature range from about 30° C. to 90° C.

3. A sheet according to claim 2, wherein the dimensional change resulting from thermal shrinkage of the sheet in the longitudinal direction after the second stretching is about −1.2% in the temperature range from about 30° C. to 90° C.

4. A sheet according to claim 2, wherein the dimensional change resulting from thermal expansion of the sheet in the longitudinal direction after a first heating step between 30° C. and 90° C. and cooling the sheet to 30° C. again, is about 0 to +2% as the sheet is heated in a second step in the temperature rang e from about 30° C. to 90° C.

5. A sheet according to claim 1, wherein the degree of the subsequent stretching of the sheet below its glass transition in the temperature range from 30° C. to 60° C. in each of the longitudinal and transverse directions is about 5 to 9%.

* * * * *

UNITED STATES PATENT AND TRADEMARK OFFICE
CERTIFICATE OF CORRECTION

PATENT NO. : 5,238,743

DATED : August 24, 1993

INVENTOR(S) : GROLIG et al.

It is certified that error appears in the above-identified patent and that said Letters Patent is hereby corrected as shown below:

Column 7, lines 22-23 delete "temperatures of 60°C higher than its glass transition temperature" and insert --temperatures higher than its glass transition temperature of 60°C--.

Signed and Sealed this

Twenty-second Day of March, 1994

Attest:

BRUCE LEHMAN

Attesting Officer

Commissioner of Patents and Trademarks